United States Patent
Halladay et al.

[11] Patent Number: 6,132,870
[45] Date of Patent: Oct. 17, 2000

[54] REINFORCED COMPOSITE AND ADHESIVE

[75] Inventors: James R. Halladay, Harborcreek; Douglas H. Mowrey, Pleasantville; Michael Z. Wang, Erie, all of Pa.

[73] Assignee: Lord Corporation, Cary, N.C.

[21] Appl. No.: 09/049,260

[22] Filed: Mar. 27, 1998

[51] Int. Cl.[7] .................................................. B32B 15/06
[52] U.S. Cl. .................. 428/373; 428/374; 428/357; 428/359; 428/465; 524/413; 524/430; 524/431; 524/432; 524/433; 524/503; 524/510
[58] Field of Search ..................... 524/413, 430, 524/431, 432, 433, 503, 510; 428/357, 359, 465, 373, 374

[56] References Cited

U.S. PATENT DOCUMENTS

| | | |
|---|---|---|
| 3,252,278 | 5/1966 | Marzocchi et al. . |
| 3,287,204 | 11/1966 | Marzocchi . |
| 3,538,974 | 11/1970 | Marzocchi . |
| 4,051,281 | 9/1977 | van Gils et al. . |
| 4,119,587 | 10/1978 | Jazenski et al. . |
| 4,988,753 | 1/1991 | Rullmann et al. . |
| 5,036,122 | 7/1991 | Auerbach et al. . |
| 5,200,455 | 4/1993 | Warren .................................. 524/413 |
| 5,268,404 | 12/1993 | Mowrey . |
| 5,284,456 | 2/1994 | Connell et al. . |
| 5,496,884 | 3/1996 | Weih et al. . |
| 5,645,504 | 7/1997 | Westhoff . |

FOREIGN PATENT DOCUMENTS

| | | |
|---|---|---|
| 2 155 488 | 9/1985 | United Kingdom . |

*Primary Examiner*—Richard Weisberger
*Attorney, Agent, or Firm*—Burns, Doane, Swecker & Mathis, L.L.P.

[57] ABSTRACT

A composite including an elastomer of low unsaturation, a coated reinforcing fiber, an adhesive composition that bonds the elastomer to the coated reinforcing fiber including a halogenated polyolefin, a nitroso compound, a maleimide, the maleimide present in an amount of at least 50% by weight of the halogenated polyolefin.

20 Claims, 1 Drawing Sheet

REINFORCED COMPOSITE AND ADHESIVE

FIELD OF THE INVENTION

The invention relates to improved composite materials useful in making belts, tires and the like and a method for making such composite materials. The present invention further relates to an adhesive particularly useful in bonding zinc acrylate reinforced or peroxide cured hydrogenated nitrile elastomers to various substrates including treated fiberglass cord.

BACKGROUND OF THE INVENTION

Composites useful in the making of belts, tires and the like must be extremely cohesive and retain their tensile strength in use. Previous composites have yet to provide ideal retention of tensile strength and cohesive strength. This is especially true in composites including fiberglass cord bonded to durable rubbers which are low in unsaturation like peroxide cured and Zeon Super Composite (ZSC) reinforced hydrogenated nitrile elastomers (HNBR). Accordingly, there is a need for improved composites. ZSC is a zinc acrylate reinforced HNBR available from Zeon chemicals.

U.S. Pat. No. 4,051,281, herein incorporated by reference in its entirety, is directed to an aqueous alkaline dispersion of a rubbery vinyl pyridine copolymer, trimethylol phenol, and a resorcinol compound, in certain amounts, useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined or laminated (calendered) with a curable rubber compound and the resulting assembly is cured to form a composite in which the glass fiber cord is bonded to the rubber by means of the adhesive.

British Patent Publication No. 2 155 488 ("the British Patent Publication") discloses adhesive compositions including as essential ingredients 2,3 dihalo-1,3-butadiene polymer, an aromatic nitroso compound, a lead salt of phosphorous acid or of dicarboxylic acids, and at least one maleimide compound. With respect to the essential components of the adhesive components of the British Patent Publication, the aromatic nitroso component will be present in the range from 1 to 200, preferably 10 to 100 parts by weight; the lead salt will be present in an amount in the range form 10 to 200, preferably 25 to 100, and most preferably 35 to 75, pats by weight. The maleimide component will be present in an amount of 0.5 to 100, preferably 2 to 50 parts by weight; with the amounts of each component being on a basis of 100 parts of 2,3-dihalo-1,3 butadiene polymer. The British Patent Publication also states that the use of maleimide compound at 150–200 parts by weight will exhibit better environmental resistance than at 25–75 parts by weight by weight but the resulting increased cost negates its use at the higher levels except in particularly aggressive environments, where cost is a lesser factor.

U.S. Pat. No. 4,119,587 discloses compositions comprising at least one halogen-containing polymer, at least one aromatic nitroso compound, at least one salt of certain inorganic and organic acids, and, optionally, at least one maleimide compound. The claims of the patent describe the use of from zero to about 25 parts by weight, per 100 parts by weight of the halogen-containing polyolefin. The halogen-containing polymers disclosed include chlorosulfonated polyethylene and chlorinated natural rubber.

U.S. Pat. No. 5,268,404 describes adhesives including a halogenated polyolefin, an aromatic nitroso compound, metal oxide such as zinc oxide or magnesium oxide, and optionally a vulcanizing agent such as sulfur or selenium, a phenolic epoxy resin, or carbon black. The use of maleimides in amounts of 0 to 50 parts by weight per 100 parts of polyolefin is also discussed.

Copending U.S. application Ser. No. 08/889,294 filed Jul. 8, 1997 relates to an aqueous adhesive including halobutadiene homopolymer latex, aqueous soluble or dispersible phenolic resin and maleimide-based compound. The maleimide-based compound is present in the adhesive composition in an amount of 10 to 35, preferably 10 to 20, percent dry weight based on the primary components of the adhesive composition.

Accordingly, it is an object of the present invention to provide improved composite materials useful in making belts, tires and the like that include fiber reinforced nitrogen containing rubbers.

It is further an object of the present invention to provide an adhesive useful in bonding rubbers low in unsaturation with various substrates including fibers, cloth, or metal.

SUMMARY OF THE INVENTION

The present invention generally relates to a reinforced composite including an elastomer of low unsaturation, a reinforcing fiber, an adhesive composition that bonds the elastomer to the coated reinforcing fiber including a halogenated polyolefin, a nitroso compound, a maleimide, the maleimide present in an amount of at least 50% by weight of the halogenated polyolefin. The present invention further relates to a method for making such a composite and an adhesive therefor.

DETAILED DESCRIPTION OF THE INVENTION

Figure 1:
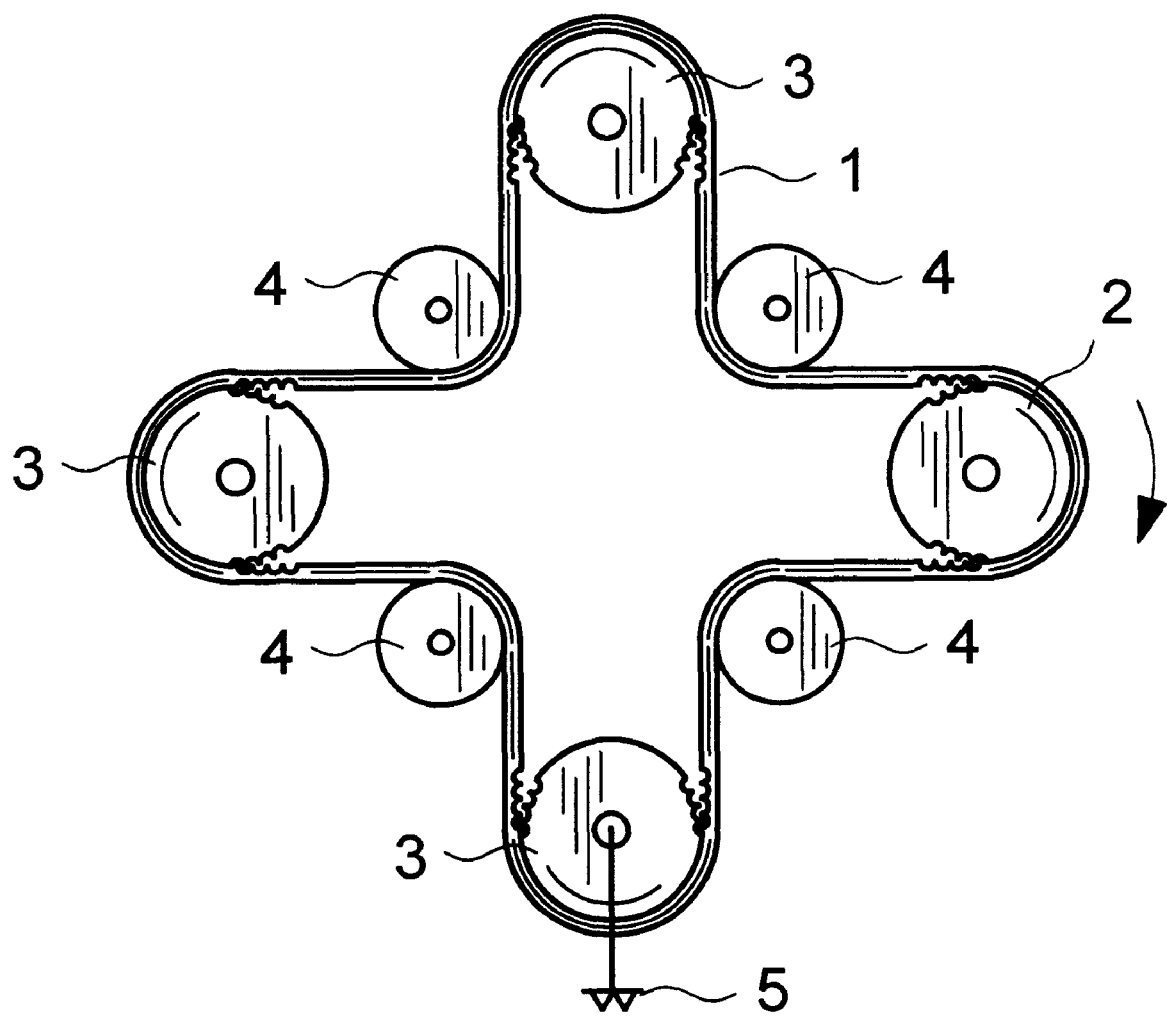
FIG. 1 is a heat resistance travel testing machine.

The composites of the present invention include an elastomer of low unsaturation, a reinforcing fiber and an adhesive adapted to provide improved adhesion and retention of tensile strength in the composite. The principle components of the adhesive composition are a halogenated polyolefin, a nitroso compound, and a maleimide.

Two or more layers can be bonded together in accordance with the present invention. For example, the adhesive impregnated reinforcing fiber can be sandwiched between and bonded to outer vulcanizable elastomer layers to form a composite multilayer structure. Additional adhesive treated substrates, such as a fabric sheathing, can also be applied to an outer surface of the multilayered structure. Exemplary articles which can be formed using the adhesives of the invention include tires as well as any of a wide variety of reinforced belts, for example synchronous and serpentine belts for the automotive industry and other industrial applications, which can include a fiberglass reinforcing layer sandwiched between outer vulcanized rubber layers, hoses, air springs, and the like. The adhesive of the present invention can also be used to bond both a reinforcing fiber to an outer vulcanizable elastomer as well as the elastomer to an outer fabric sheathing.

The elastomers of low unsaturation in accordance with the present invention are preferably elastomers that provide good environmental stability in the manufacture of belts, tires, and the like. For example, elastomers having 90% or more saturation are preferred. One typical method in the art for determining the degree of unsaturation is the iodine index. Preferred elastomers have an iodine value of less than 40. The most preferred elastomers of low unsaturation are peroxide cured and ZSC (zinc acrylate) reinforced HNBR.

Glass compositions useful in making the fibers for the reinforced composite are well known to the art. See U.S. Pat. No. 4,051,281. A preferred glass to use is a glass known as E glass and described in "Mechanics of Pneumatic Tires," Clark, National Bureau of Standards Monograph 122, U.S. Dept. of Commerce, issued November, 1971, pages 241–243, 290, and 291. The number of glass filaments or fibers employed can vary considerably depending on the ultimate use or service requirements. Likewise, the number of strands of glass fibers used to make a reinforced composite can vary widely. In general, the number of filaments in the glass fibers in a single reinforcing element or cord for a passenger car tire can vary from about 500 to 3,000.

After the glass fibers are formed they are typically sized (by spraying or dipping and so forth and air drying) with a very small amount or fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. Various glass fiber sizing compounds and compositions are shown in U.S. Pat. Nos. 3,252,278; 3,287,204; and 3,538,974 which are incorporated by reference herein. Other reinforcing fibers such as polyesters, nylons, and kevlar may also be used.

The primer can be any primer typically used in preparing glass fibers for bonding. For example, a resorcinol-formaldehyde novolak or novolak resin or mixture thereof can be used. The mol ratio of resorcinol to formaldehyde can vary over a considerable range to provide novolaks useful in the practice of the present invention although a preferred mol ratio of resorcinol to formaldehyde is about 1:0.5 to 2.0. These compounds and methods for making them are well known in the art. Other primers such as polyisocyanates may be used.

The halogen-containing polyolefin component of the adhesive can be natural or synthetic elastomers. The halogens employed in the halogenated polyolefinic elastomers will usually be chlorine or bromine, although fluorine can also be used. Mixed halogens can also be employed in which case the halogen-containing polyolefinic elastomer will have more than one halogen substituted thereon. The amount of halogen does not appear critical and can range from as low as about 3 weight percent to more than 70 weight percent, depending on the nature of the base polymer. Halogen-containing polyolefinic elastomers and their preparation are well-known in the art and no need is seen to elucidate in any detail on these materials or their manufacture. Representative halogen-containing polyolefinic elastomers include, without being limited thereto, chlorinated natural rubber, chlorine- and bromine-containing synthetic rubbers including polychloroprene, chlorinated polychloroprene, chlorinated polybutadiene, chlorinated butadiene styrene copolymers, chlorinated ethylene propylene copolymers and ethylene/propylene/non-conjugated diene terpolymers, chlorinated polyethylene, chlorosulfonated polyethylene, brominated poly(1,3-dichloro-1,3-butadiene), copolymers of alphachloroacrylonitrile and 2,3-dichloro-1,3-butadiene, chlorinated poly(vinyl chloride), and the like, including mixtures of such halogen-containing elastomers. Thus, substantially any of the known halogen-containing derivatives of natural and synthetic elastomers can be employed in the practice of this invention, including mixtures of such elastomers. At the present time, chlorosulfonated polyethylene elastomers alone or in combination with chlorinated rubber constitute preferred halogen-containing film-forming polymers. The halogenated polyolefins are present in amounts of 20–60 weight percent and preferably 35 to 45 weight percent of the principal components.

One embodiment of the present invention is directed to the absence of 2,3-dihalo-1,3-butadiene in the adhesive. The absence of this ingredient provides for a more storage stable adhesive. The absence of such components also provides for improved bonding.

The nitroso compound of the adhesive may be a nitroso compound per se, or a nitroso compound precursor. The nitroso compound can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having form 1 to 3 aromatic nuclei, including fused aromatic nuclei, having from 2 to 6 nitroso groups attached directly to non-adjacent nuclear carbon atoms. The present preferred nitroso compounds are the dinitroso aromatic compounds, especially the dinitrosobenzenes and dinitrosonaphthalenes, such as the meta- or para-dinitrobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds unless otherwise specified.

A partial non-limiting listing of nitroso compounds which are suitable for use in the practice of the invention include m-dinitrosobenzene, p-dinitrosobenzene, -dinitrosonaphthalene, p-dinitrosonaphthalene, 2,5 dinitroso-p-cymeme, 2-methyl-1,4-dinitrosobenzene, 2-methyl-5-chloro-1,4 dinitrosobenzene, 2-cyclohexyl-1,4 dinitrosobenzene and combinations thereof. The particularly preferred nitroso compound in accordance with the present invention is poly-dinitrosobenzene. The nitroso compound may be present in amounts of 1 to 50 weight percent and preferably 5 to 30 weight percent of the principal components.

The maleimide of the adhesive are maleimide based compounds such as an aliphatic or aromatic bismaleimide or polymaleimide. The maleimide compound can be any compound containing at least two maleimide groups. Suitable maleimide compounds include the N, N' linked bismaleimides which are either joined directly at the nitrogen atoms without any intervening structure or in which the nitrogen atoms are joined and separated by an intervening divalent radical such as alkylene, cycloalkylene, epoxydimethylene, phenylene (all three isomers), 2,6-dimethylene-4-alkylphenol or sulfonyl. The maleimide compound may also be an aromatic polymaleimide compound. An example of a maleimide compound wherein the maleimide groups are attached to a phenylene radical is m-phenylene bismaleimide and is available as HVA-2 from E. I. Du Pont de Nemours & Co. This is the preferred maleimide in accordance with the present invention. The maleimide is present in an amount of at least 50% of the halogenated polyolefin.

The metal oxides which are suitable for use in the present invention are zinc oxide and magnesium oxide. The metal oxides are well-known articles of commerce and need not be discussed here in detail.

If desired, the adhesive compositions of the invention can include conventional additives such as inert filler material, polymeric film-forming adjuncts, pigments, solvent and the like, with the amounts of such additions being within the range customarily employed. A particularly preferred filler is carbon black and when utilized is incorporated in amounts ranging from 0 to 20% by weight.

The adhesive compositions of this invention are prepared by conventional means. For ease of application, as is conventional in this art, the components will be mixed and dispersed in an inert liquid carrier which, once the composition has been applied, can be readily evaporated. Examples of suitable carriers are aromatic and halogenated aromatic hydrocarbons such as benzene, toluene, xylene, chlorobenzene, dichlorobenzene, and the like; halogenated aliphatic hydrocarbons such as trichloroethylene, perchloroethylene, propylene dichloride and the like; ketones such as methyl ethyl ketone, methyl isobutyl ketone, and the like; ethers, naphthas, etc., including mixtures of such carriers. The amount of the carrier employed is that which provides a composition suitable for use as an adhesive. This amount will ordinarily be such as to provide a total solids content ranging from about 5 to 80, preferably about 15 to about 40 percent by weight.

The adhesive is applied to substrate surfaces in a conventional manner such as by dipping, spraying, brushing, and the like. Preferably, the substrate surfaces are allowed to dry after coating before being brought together. After the surfaces have been pressed together with the adhesive layer in between, the assembly is heated in accordance with conventional practices. The exact conditions selected will depend upon the particular elastomer being bonded and whether or not it is cured.

A preferred embodiment of the adhesive is as follows:

| Ingredient | Amount |
| --- | --- |
| Chlorosulphonated Polyethylene | 3.38 |
| Chlorinated Natural Rubber | 7.90 |
| Carbonblack | 1.39 |
| Zinc Oxide | 1.39 |
| Poly-dinitrosobenzene | 1.55 |
| Bismaleimide | 7.33 |
| Xylene | 77.03 |

One method for making belts in accordance with the present invention is as follows. E-glass strands or fibers are dipped in primer until a solids content of generally between about 1 and about 40% is established. Optional twists can be applied to the glass strands if desired. After drying, adhesive is applied to the prime coated fibers and they are then embedded in elastomers of low unsaturation. Those of ordinary skill in the art will appreciate that there are many ways of achieving embedding including pressing and extrusion. Moreover, one or more of the sizing, prime coating, adhesive and elastomers may be coextruded. Patents that describe the making of belts and tires hereby incorporated by reference in their entirety include: U.S. Pat. Nos. 5,645,504; 5,284,456 and 3,433,689.

The following non-limiting examples are included to illustrate various embodiments of the present invention. They do not limit the claimed invention in any way.

Examples

Adhesive Examples 1 and 2

Examples 1 and 2 are in accordance with the present invention. All amounts are expressed in weight percentages.

| Ingredient | Amount - Example 1 | Amount Example 2 |
| --- | --- | --- |
| Hypalon (Chlorosulphonated Polyethylene) | 3.38 | 5.5 |
| Pergut s130 (Chlorinated Natural Rubber) | 7.90 | 2.4 |
| Witco N762 (Carbonblack) | 1.39 | 2.0 |
| Kadox (zinc oxide) | 1.39 | 2.2 |
| (Poly-dinitrosobenzene) | 4.51 | 2.6 |
| HVA-2 (bismaleimide) | 7.33 | 5.3 |
| Xylene | 74.10 | 80 |

The formulations are prepared as follows. First, a Hypalon/Pergut s130 blend solution is prepared in xylene. Next, a master batch is prepared which includes a ground mixture of DNB, HVA-2, zinc oxide, carbon black, part of the Hypalon/Pergut s130 blend solution and xylene. Preferably ⅓ of the Hypalon solution is added to enhance grinding. The remainder is blended in after grinding. Grinding is accomplished in conventional equipment such as a Kady mill.

Testing of Example 1

The adhesive was applied to RFL treated fiberglass cord surface by dipping it in the adhesive. A rubber stock of ZSC/HNBR (peroxide cured) milled to approximately ⅛ inch thick was applied to the dipped cord surface between two surfaces. The rubber-to-cord assembly was then cured using a cure time of 40 minutes and a temperature of 320° F. Rubber-to-cord bonded samples were peeled on a United Technologies peel tester Model No. 3SFM-20-3CAP at 2 inches per minute in a T-peel mode. Good bonding is accomplished when the rubber tears leaving behind a layer on the cord strip surface since the adhesion of the of the adhesive is greater than the cohesion of the rubber. Environmental resistance of the adhesives were tested after heat aging at 140° C. for 1 week and boiling in water for 1 hour. The results were as follows:

Primary Adhesion: 72 lbs per inch, 100% Rubber

Heat Aging: 50 lbs per inch, 100% Rubber (140° C., 168 hrs.)

Boiling Water (1 hr): 71 lbs per inch, 100% Rubber

Testing of Example 2

This formulation was tested as a covercoat adhesive for bonding peroxide cured ZSC reinforced HNBR as well as peroxide cured HNBR to adhesive primed metal substrates. A substrate of Zinc phosphatized cold rolled steel was prime coated with Chemlok 8003 available from the Lord Corporation. The substrate was then sprayed with a covercoat layer of the adhesive of Example 2. Then, the ZSC reinforced HNBR or peroxide cured HNBR was applied to the covercoated substrate and cured for 25 minutes at a temperature of 325° F.

The following tests known to those of ordinary skill in the art were used in the testing of Example 2.

A. Primary Adhesion Test

Hand peel conducted with needle nose pliers (hand peeled) followed by visual examination of 1 inch square bond area for percent rubber retention.

B. Boiling Water Test

After 2 hours immersion in boiling water with a 2 kg load, the rubber is again peeled with pliers to inspect the bond for rubber retention.

C. Jet Fuel Immersion Test (JP-4)

Bonded parts are immersed in JP-4 jet fuel for 7 days at room temperature. The samples are then hand peeled and visually inspected for percent rubber retention.

D. Oil Immersion Test (MIL-C-7808)

Bonded parts are immersed in MIL-C-7808 oil for 7 days at 158° F. At the conclusion, the parts are hand peeled and visually inspected for percent rubber retention.

E. Oil Immersion Test (MIL-C-23699)

Bonded parts are immersed in MIL-C-23699 oil for 7 days at 158° F. At the conclusion, the parts are hand peeled and visually inspected for percent rubber retention.

The following test results were obtained for the formulations of Example 2:

|  | % Rubber Retention | |
| --- | --- | --- |
| Test | Peroxide Cured HNBR | ZSC Reinforced HNBR |
| A. Primary Adhesion | 100 | 97 |
| B. Boiling Water | 100 | 97 |
| C. Jet Fuel | 100 | 97 |
| D. Oil (MIL-C-7808) | 100 | 93 |
| E. Oil (MIL-C-23699) | 100 | 95 |

Manufacture of a Belt—Comparative Testing

Comparative testing was conducted using Chemlok 233X available from the Lord Corporation vs. the formulation of Example 1 above.

Samples for initial adhesion and adhesion after aging testing were prepared as follows:

E-glass was drawn to form filaments having a diameter of 9 microns. The filaments were bundled by using a sizing agent to give glass strands having a yardage of 33.7 tex. Three glass strands were dipped together in RFL having a composition of Resorcinol-formaldehyde resin and latex. The excess of the impregnate RFL was then removed until its solid content became 20% by weight based on the glass cord. The coated glass strands were further heat-treated at 250° C. for 2 minutes to give an impregnate-treated glass fiber bundle. The glass fiber bundle was given a primary twist of 2.0 turns per inch in the Z direction. Eleven such primary twisted glass fiber bundles were given a secondary twist of 2.0 turns per inch in the S direction.

The secondary twisted glass fiber bundles were dipped in the overcoating agent of Example 1 above. The excess of the agent was removed until its solid content became 5% by weight based on the glass cord. The overcoated glass cord was dried at 120° C. for 2 minutes. The cord was cut into pieces having a length of 120 mm. A sheet of uncured ZSC/HNBR rubber having the formulation shown in Table I was prepared, and 20 such cord pieces were aligned parallel to each other (total width 25 mm) on the rubber sheet. The assembly was pressed both from top and bottom at 160° C. for 30 minutes to effect curing. After curing, the end portion of the cord and the end portion of the rubber were firmly grasped and pulled apart in opposite directions to each other to peel the cords from the rubber. The level of adhesion of the cord to rubber was measured and the condition of the interface between the cords and rubber assessed. Then adhesion after 96 hours at 140° C. was also evaluated in the same manner.

A similar sample was prepared using Chemlok 233X available from the Lord Corporation. The results of the evaluations are shown in Table 2.

Samples for comparative testing of retention of tensile strength were prepared as follows:

Using the glass cord described above (S direction twist and Z direction twist) as a reinforcing fiber and a rubber having the same formulation as in Table I, a toothed belt having a width of 19 mm and a length of 980 mm was fabricated. This toothed belt was attached to a heat-resistance travel testing machine equipped with a driving motor of 6000 rpm shown in FIG. 1. It is noted that the toothed belt 1, which is a subject to be tested, transmits a driving force of a driving pulley 2 rotatively driven at 6000 rpm by the driving motor (not shown) to a follower pulley 3. An idler 4 is used to adjust the degree of tension to the toothed belt 1. A heat resistance travel test was carried out for 600 hours under an environment of 120° C. After the test, a tensile strength of the belt was measured to determine a retention of tensile strength. Table II shows the results.

TABLE I

| ZSC/HNBR Rubber Formulation | |
| --- | --- |
| Ingredient | Parts by Weight |
| ZETPOL 2020* | 70 |
| ASC 2295N* | 30 |
| ZnO #1 | 5 |
| Stearic acid | 1 |
| Trioctyl trimellitate | 5 |
| HAF Carbon (N-774) | 30 |
| 4,4-(α,α-Dimethylbensyl)-Diphenylamine | 1.5 |
| Zinc salt of 2-Mercatobenzimidazole | 1.5 |
| Vul-kup 40KE** | 6 |

*Available from Nippon Zeon Ltd.
**1,3-Bis-(t-butylperoxy-isopropyl)-Benzene)40% available from Hercules Ltd.

TABLE II

| Sample ID | Initial Adhesion Kg/25 mm | Adhesion after Aging Kg/25 mm | Retention of Tensile Strength |
| --- | --- | --- | --- |
| Example 1 | 30.0 | 25.0 | 70% |
| Chemlok 233X | 6.0 | 5.0 | 30% |

In the initial adhesion and adhesion after aging tests, rubber failure was observed with respect to the adhesive of Example 1 in contrast to the rubber/cord separation observed with Chemlok 233X.

We claim:

1. A composite comprising:
   a. an elastomer of low unsaturation,
   b. a reinforcing fiber,
   c. an adhesive composition that bonds the elastomer to the reinforcing fiber comprising a halogenated polyolefin, a nitroso compound, a maleimide, the maleimide present in an amount of at least 50% by weight of the halogenated polyolefin wherein the elastomer of low unsaturation has an iodine index value of less than about 40 mg/100 mg of elastomer.

2. The composite of claim 1, the reinforcing fiber further comprising a primer.

3. The composite of claim 1, wherein the elastomer of low unsaturation is a zinc acrylate or peroxide cured reinforced hydrogenated nitrile elastomer.

4. The composite of claim 1, wherein the fiber is E-glass.

5. The composite of claim 1, further comprising a fabric sheathing.

6. The composite of claim 2, wherein the prime coating is a resorcinol-formaldehyde resin.

7. The composite of claim 1, the reinforcing fiber further comprising a sizing layer intermediate the fiber and the prime coating.

8. The composite of claim 1, wherein said adhesive includes substantially no amount of 2,3-dihalo-1,3-butadiene.

9. The composite of claim 1, the adhesive further comprising an inorganic filler, an acid scavenger, or an organic solvent and mixtures thereof.

10. The composite of claim 1, the adhesive further comprising carbon black, zinc oxide, or mixtures thereof.

11. The composite of claim 1, wherein the nitroso compound is a nitrosobenzene.

12. The composite of claim 1, wherein the maleimide is a bismaleimide.

13. The composite of claim 1, the adhesive further comprising xylene, benzene, toluene, chlorobenzene, dichlorobenzene or mixtures thereof.

14. The composite of claim 1, wherein the halogenated polyolefin is a mixture of chlorosulphonated polyethylene and chlorinated natural rubber.

15. A belt comprising the composite of claim 1.

16. A tire comprising the composite of claim 1.

17. The composite of claim 4, wherein the fabric sheathing is bonded to the elastomer of low unsaturation with the adhesive.

18. A method for making a composite comprising:

applying a prime coating to a fiber, applying an adhesive coating to the coated fiber comprising a halogenated polyolefin, a nitroso compound, a maleimide, the maleimide present in an amount of at least 50% by weight of the halogenated polyolefin, applying a elastomer to the adhesive coated reinforcing fiber to for a composite, and;

curing the composite wherein the elastomer of low unsaturation has an iodine index value of less than about 40 mg/100 mg of elastomer.

19. The method of claim 18, wherein one or more of the prime coating, the adhesive coating, and the nitrile containing elastomer are coextruded with the fiber.

20. The method of claim 18, further comprising applying a covering of fabric to the composite.

* * * * *